United States Patent [19]

Kamijo et al.

[11] Patent Number: 4,718,751
[45] Date of Patent: Jan. 12, 1988

[54] OPTICAL PANEL AND METHOD OF FABRICATION

[75] Inventors: Koichi Kamijo; Yukihiro Iwashita; Koji Sumi, all of Nagano, Japan

[73] Assignee: Seiko Epson Corporation, Tokyo, Japan

[21] Appl. No.: 798,089

[22] Filed: Nov. 14, 1985

[30] Foreign Application Priority Data

Nov. 16, 1984 [JP] Japan .................. 59-241935
Nov. 30, 1984 [JP] Japan .................. 59-254453

[51] Int. Cl.⁴ .................................. G02F 1/13
[52] U.S. Cl. ........................ 350/336; 350/339 R
[58] Field of Search ............ 350/336, 339 R, 340, 350/341, 356, 357, 358

[56] References Cited

U.S. PATENT DOCUMENTS 4,297,004 10/1981 Nishimura et al. ............ 350/336
4,431,270 2/1984 Funada et al. ............ 350/336
4,474,432 10/1984 Takamatsu et al. ............ 350/336
4,527,865 7/1985 Washo et al. ............ 350/336
4,587,038 5/1986 Tamura ............ 350/336

FOREIGN PATENT DOCUMENTS 8005195 3/1980 France ............ 350/336

Primary Examiner—John K. Corbin
Assistant Examiner—Martin Lerner
Attorney, Agent, or Firm—Blum Kaplan

[57] ABSTRACT

An optical panel having superior environment resisting properties is provided. An increase in electrical resistance is prevented by heat treating the electrode in a vacuum at a temperature between about 200° and 600° C. Electrolytic corrosion resistance of the panel is provided by coating at least the non-conductive portions of the terminal portions of the panel with a water-repellant material.

14 Claims, 9 Drawing Figures

OPTICAL PANEL AND METHOD OF FABRICATION

BACKGROUND OF THE INVENTION

This invention relates to optical panels and, in particular, to novel optical panels having superior environment resisting properties.

A conventional liquid crystal display device provides a digital display and includes a liquid crystal panel formed from two opposed substrates with a normally transparent liquid crystal material sealed between the substrates. Transparent electrodes are selectively disposed on the inner surface of each substrate in character forming segments with leads extending to the edges of the display. A voltage applied between opposed electrode segments alters the orderly arrangement of the molecules in the liquid crystal material to render the portion between the electrodes visually distinguishable from the remainder of the liquid crystal material.

In these conventional devices, it is desirable that the electrical resistance of all conductive material in the optical panel, i.e. each electrode terminal portion, remain constant. However, problems often arise because the electrical resistance of an electrode increases when the electrode is formed in a humid environment. Electrical resistance of the electrode also increases when the electrode is connected to the circuit substrate using electrically conductive rubber, or the like. Additionally, a terminal portion of an electrode can break as a result of electrolytic corrosion. Electrolytic corrosion can be measured in a test of current-conduction/moisture resistant properties of the liquid crystal display. Furthermore, when current conduction or electrical conduction continues through an optical path in an environment in which humidity changes significantly, disconnection can occur at a terminal portion of an electrode. Disconnection results, for example, from atmospheric moisture that causes the electrodes to become wet with dew or, alternatively, from electrolytic corrosion.

Accordingly, it is desirable to provide a novel optical panel and method of forming electrodes in that panel which overcome the disadvantages inherent in prior art optical panels.

SUMMARY OF THE INVENTION

Generally speaking, in accordance with the invention a novel optical panel having transparent electrodes which have been heat treated in a vacuum at a temperature between about 200° and 600° C. in order to prevent an increase in electrical resistance due to environmental conditions such as humidity is provided. At least the non-conductive portions of the terminal portions of the electrodes are coated with water-repellant material to improve the electrolytic corrosion resistance of the panel.

Accordingly, it is an object of the invention to provide a display panel having improved resistance to increases in resistance in the display electrode and improved resistance to electrolytic corrosion.

It is another object of the invention to provide a method for improving the electrical resistance properties of display electrodes and the electrolytic corrosion resistance of the display.

It is a further object of the invention to provide an optical panel having transparent electrodes that have been heat treated in a vacuum at a temperature between about 200° and 600° C.

It is another object of the present invention to provide a display device having an optical panel incorporated therein, and wherein the optical panel has transparent electrodes that have been heat treated in a vacuum at a temperature between about 200° and 600° C., and wherein the optical panel is adapted to be connected to a driving circuit.

It is a further object of the invention to provide an optical panel having transparent electrodes in which at least a nonconductive portion of a terminal portion of the electrode that is used for connecting the electrode to a driving circuit is waterrepellant as a result of baking the electrode in atmospheric air.

Still other objects and advantages of the invention will in part be obvious and will, in part, be apparent from the specification.

The invention accordingly comprises an article of manufacture possessing the features, properties, and the relation of elements and the several steps and the relation of one or more of such steps with respect to each of the others thereof, which will be exemplified in the article and the method hereinafter described, and the scope of the invention will be indicated in the claims.

DESCRIPTION OF THE DRAWINGS

For a fuller understanding of the invention, reference is had to the following description taken in connection with the accompanying drawings, in which.

DESCRIPTION OF PREFERRED EMBODIMENTS

The optical panel constructed in accordance with the invention includes transparent electrodes that are heat treated in a vacuum to a temperature between about 200° and 600° C. in order to prevent an increase in electrical resistance due to environmental conditions such as humidity. In another embodiment of the invention the non-conductive regions of the terminal portion of the panel used to connect the panel to an external driving circuit are rendered water-repellant by baking in atmospheric air.

As used in this application, the term "optical panel" is intended in its broadest sense and includes not only liquid crystal display panels illustrated herein, but also includes electrochromic panels, electrophoresis panels, electroluminescence panels, plasma panels, digitron panels and the like. An optical device incorporating an optical panel is defined to include any device in which an optical panel prepared in accordance with the invention is electrically connected to a driving circuit. The electrical connection can be accomplished using electrically conductive rubber, a flexible substrate, a plastic film formed with a conductive path of the type known as a "heat seal" and the like.

Devices including optical panels provided with an integrated circuit on the rear surface or on an extended portion of a substrate of the panel include displays for watches, electronic desk calculators, computers and the like. Optical electrographic devices utilize optical panels as light valves. Optical electrographic devices are arranged so that a plurality of light transmitting/blocking dot patterns are formed on a liquid crystal panel. Light irradiated on one side of the panel is selectively transmitted by controlling patterns of light shutters by a driving circuit. A latent image can be formed on a photosensitive drum by the light which is selectively transmitted through the light valves. The portion of the optical electrographic device that forms the image is the optical panel. After formation on the photosensitive surface of the drum, the latent image is developed and fixed on recording paper.

Optical panels in accordance with the invention can be utilized with liquid crystal display devices operating in the twisted nematic mode, the dynamic scattering mode (DSM), the ECB and the like. Furthermore, the optical panels can include a liquid crystal display in the form of a plurality of liquid crystal layers. The liquid crystal material can include an optical activator such as a chiral nematic liquid crystal material, a cholesteric liquid crystal and the like.

For a better understanding of the optical panels constructed in accordance with the invention, reference is made to the following examples. These examples are presented for purposes of illustration only and are not intended in a limiting sense.

EXAMPLE 1

Figure 1:
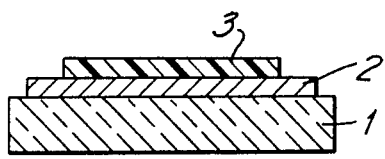
FIG. 1 is a cross-sectional view of an electrode substrate prepared in accordance with the invention.

An electrode prepared in accordance with this Example 1 is shown in FIG. 1.

An indium oxide/tin film ("ITO film") 2 having a thickness of 600 Å was formed on a soda glass substrate 1 by vacuum evaporation and was patterned using photolithography. Polyamide resin ("PI resin") 3 was deposited on ITO film 2 as an orientation processing film. The structure was placed in a vacuum kiln and evacuated to $10^{-3}$ Torr and then baked at a temperature of 300° C. for one hour using an infrared heater. After baking, the PI film had sufficient hardness as an orientation film and sufficient adherence and orientation properties with respect to the substrate to make the structure useful as an electrode. The electrical resistance of the electrode before and after baking in vacuum is shown in Table 1.

TABLE 1

| Before Baking in Vacuum | 50 Ω/□ |
|---|---|
| After Baking in Vacuum | 50 Ω/□ |

The same structure was prepared and baked at 200° C. for one hour in environmental air instead of under vacuum. The electrical resistance of the electrode before and after baking in environmental air is shown in Table 2.

TABLE 2

| Before Baking in Environmental Air | 50 Ω/□ |
|---|---|

TABLE 2-continued

| After Baking in Environmental Air | 78 Ω/□ |
|---|---|

One hundred (100) electrodes were prepared by baking the structure in a vacuum and another one hundred (100) electrodes were prepared by baking the structure in an air atmosphere in accordance with the above procedures. Liquid crystal display devices were assembled using the electrode substrates and placed into driving modules. The electrodes were tested by driving the display devices under different environmental conditions. The display devices were driven at 60° C. and 90% relative humidity ("RH") for thirty (30) minutes and then at 20° C. and 50% RH for another thirty (30) minutes. The RH of the environment was alternated every thirty (30) minutes, a total of seven (7) times. Table 3 shows the number of display devices that failed due to electrolytic corrosion reactions.

TABLE 3

| Number of Times of Test | 1 | 2 | 3 | 4 | 5 | 6 | 7 | Total |
|---|---|---|---|---|---|---|---|---|
| Products Baked in Vacuum | 0 | 0 | 0 | 0 | 0 | 0 | 0 | 0 |
| Products Baked in Air | 0 | 0 | 1 | 0 | 2 | 2 | 1 | 6 |

As can be seen, when the electrodes were baked under a vacuum and included in a liquid crystal display device, it was possible to provide electrodes which did not increase in electrical resistance. Furthermore, display devices including electrodes which were heated under vacuum resisted electrolytic corrosion resulting from environmental changes better than display devices including electrodes heated in an air atmosphere.

EXAMPLE 2

Figure 2:
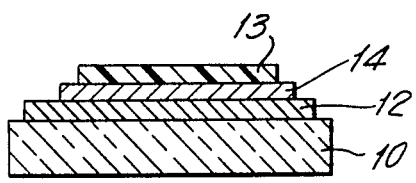
FIG. 2 is a cross-sectional view of another electrode substrate in accordance with the invention.

An electrode prepared in accordance with Example 2 is shown in FIG. 2.

An ITO film 12 having a thickness of 600 Å was formed on a soda glass substrate 10 by vacuum evaporation and film 12 was patterned using a printing method. A silicon dioxide film 14 having a thickness of 1000 Å was formed on patterned ITO film 12 by a spattering method. Then a PI resin 13 was deposited on $SiO_2$ film 14. The structure was baked under vacuum as described in Example 1. The change in electrical resistance of the ITO electrode before and after baking in vacuum is shown in Table 4.

TABLE 4

| Before Baking in Vacuum | 50 Ω/□ |
|---|---|
| After Baking in Vacuum | 50 Ω/□ |

A liquid crystal display was assembled using the electrode described and the LCD was incorporated into a driving module. The driving module was subjected to the electrolytic corrosion reaction test as described in Example 1. The results of the test are shown in Table 5.

TABLE 5

| Number of Times of Test | 1 | 2 | 3 | 4 | 5 | 6 | 7 | Total |
|---|---|---|---|---|---|---|---|---|
| Products Baked in Vacuum | 0 | 0 | 0 | 0 | 0 | 0 | 0 | 0 |

As can be seen from the results of Table 5, when a $SiO_2$ film is formed on an ITO electrode using a spattering method, it is possible to produce LCDs which do not show an increase in electrical resistance and which are effective in resisting electrolytic corrosion due to humidity in the environment.

EXAMPLE 3

Figure 3:
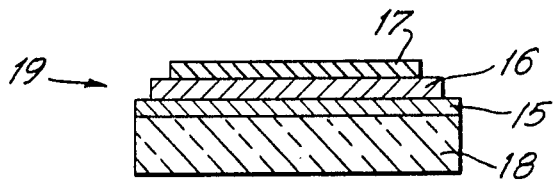
FIG. 3 is a cross-sectional view of a third electrode of the present invention.

The electrode assembly 19 prepared in accordance with this Example is shown in FIG. 3.

A SiO$_2$ film 15 having a thickness of 1000 Å was formed using OCD (produced by Tokyo Applied Chemistry Industry Co, Ltd) on a soda glass substrate 18. An ITO film 16 having a thickness of 600 Å was formed on silicon dioxide film 15 using a spattering method. ITO film 16 was patterned using photolithography and then a second SiO$_2$ film 17 was applied using OCD.

The structure was placed in a vacuum kiln and evacuated to 1 Torr and then heated to 450° C. for two hours using a Nichrome wire heater. After heating, SiO$_2$ film 15 was 800 Å thick. Table 6 shows the change in electrical resistance of electrode 16 before and after heating under vacuum.

TABLE 6

| | |
|---|---|
| Before Baking in Vacuum | 50 Ω/□ |
| After Baking in Vacuum | 55 Ω/□ |

An electrode having the same structure as assembly 19 was prepared and heated in an air atmosphere, instead of under vacuum, at 450° C. for two hours. Table 7 shows the change in electrical resistance of this electrode before and after heating in an air atmosphere.

TABLE 7

| | |
|---|---|
| Before Baking in Atmospheric Air | 50 Ω/□ |
| After Baking in Atmospheric Air | 175 Ω/□ |

Liquid crystal display devices were assembled using electrodes prepared in accordance with this example and were incorporated into driving modules. The driving modules were subjected to the electrolytic corrosion reaction test as described in Example 1. The results of the electrolytic corrosion reaction tests are shown in Table 8.

TABLE 8

| Number of Times of Test | 1 | 2 | 3 | 4 | 5 | 6 | 7 | Total |
|---|---|---|---|---|---|---|---|---|
| Products Baked in Vacuum | 0 | 0 | 0 | 0 | 0 | 0 | 0 | 0 |
| Products Baked in Air | 0 | 0 | 0 | 0 | 0 | 0 | 0 | 0 |

As shown in these results, when OCD was used to apply a SiO$_2$ film onto a soda glass substrate, a higher temperature was required for baking than when a PI resin was used. However, by baking the electrodes under vacuum it was still possible to produce electrodes in which an increase in electrical resistance was suppressed and which were superior in resisting corrosion.

EXAMPLE 4

Figure 4:
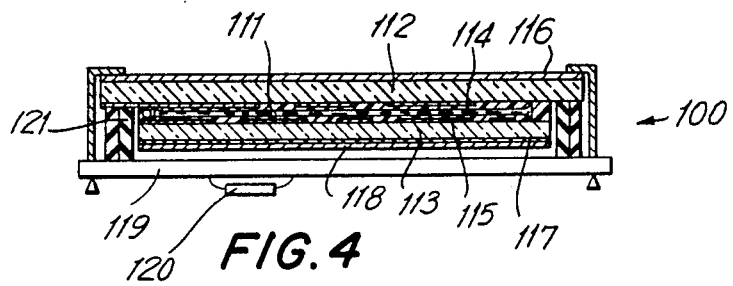
FIG. 4 is a cross-sectional view of a liquid crystal display device including an optical panel constructed in accordance with the invention.

A liquid crystal display panel was connected to a driving circuit to provide a liquid crystal display assembly 100 as shown in FIG. 4.

An oriented twisted liquid crystal material 111 was sandwiched between a pair of opposed glass substrates 112 and 113 to form the liquid crystal panel. A pair of polarization plates 116 and 117 were disposed above and below glass substrates 112 and 113, respectively, in a predetermined relationship with the direction of orientation of liquid crystal layer 111. A reflector 118 was disposed under lower polarization plate 117. Transparent ITO electrodes 114 and 115 were formed on substrate 112 and 113, respectively, and connected through electrically conductive rubber connector 121 to a driving circuit substrate 119 having an integrated circuit 120 with a driving circuit mounted on the lower surface.

Increasing the corrosion resistance of electrodes in accordance with the invention can be used when a material requiring no nitrogen, oxygen or moisture in atmospheric air is formed on a transparent electrode by heating. It is apparent that surface oxidation of a metal film can be prevented when an LCD is produced using a transparent electrode film. The transparent electrode film can be an SnO$_2$ film, a so-called Nesa film, an In$_2$O$_3$ electrode or the like with electrical resistance which increases when heated in an air atmosphere. Prevention of the increase in electrical resistance is an additional advantageous feature of the invention.

The electrode substrate can be any suitable material, such as a glass plate, ceramic, plastic and the like. When the electrode is subject to heating, it is sufficient for only the terminal portion to be baked. Heating can be performed after a liquid crystal display cell has been assembled and before the liquid crystal material or the like is sealed therein or, alternatively, only the terminal portion of the electrode can be heated either before or after assembling the display panel.

An ITO electrode film is a mixture of tin oxide and indium oxide in a weight percent ratio of between about 1:200 and 200:1. The ITO film of a transparent electrode generally is between about 100 and 20,000 Å thick. In this Example, the content of tin oxide in the ITO film was about 5% by weight. In a preferred embodiment, the tin oxide content of the ITO film is between about 5 and 20% by weight. It has been determined that a tin oxide content within this range provides an electrode with a low resistance value. The tin oxide amounts specified are the amounts before spattering, evaporation or the like and, therefore, the amounts vary within a range of several percent after spattering, evaporation or heating. As far as permeability considerations are concerned, it is desirable to select the thickness of the tin oxide film to be in the range of between about 100 and 500 Å. Although the thickness of the ITO film in this Example ranged between about 300 and 700 Å, there was no increase in resistance or disconnection of the electrodes.

Figure 5A:
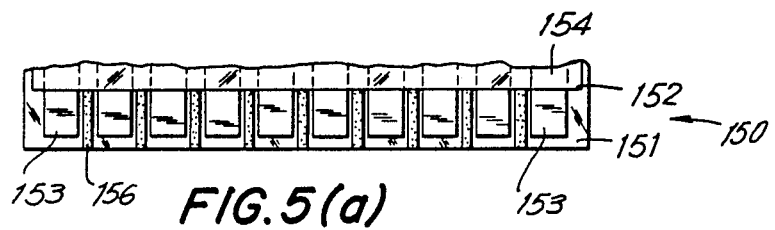
FIGS. 5(a)–(c) are plan views of the terminal portions of liquid crystal panels for use in display devices in accordance with another embodiment of the invention.
Figure 5B:
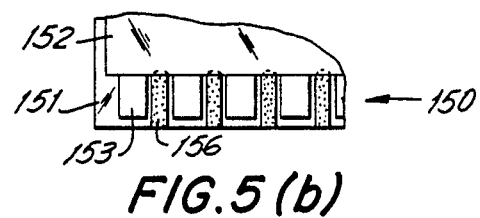
Figure 5C:
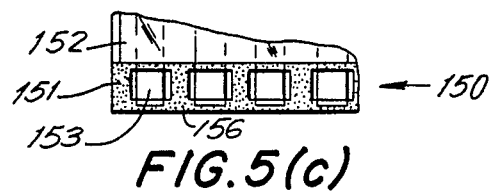
Figure 6:
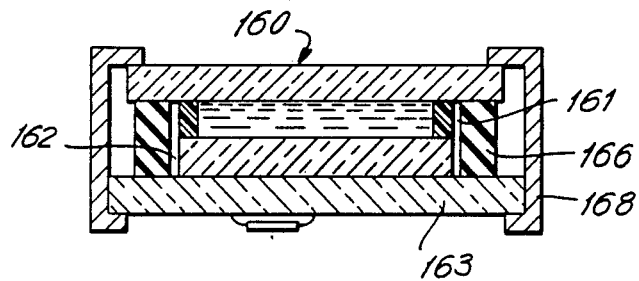
FIG. 6 is a cross-sectional view of a liquid crystal display device including an optical panel in accordance with the invention.
Figure 7:
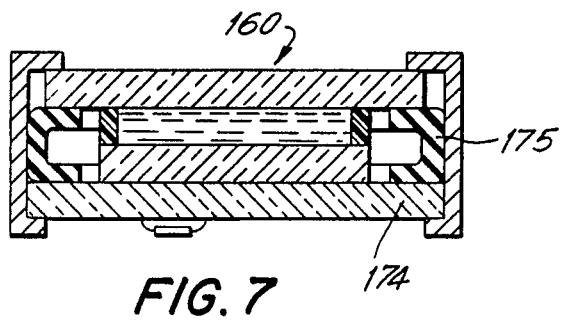
FIG. 7 is a cross-sectional view of a liquid crystal display device including an optical panel in accordance with a further embodiment of the invention.

FIGS. 5(a)–5(c) show the terminal portion of a liquid crystal display panel 150. Panel 150 is assembled so that an electrode substrate 151 extends beyond the other electrode substrate 152 on plan view A. A terminal portion 153 of electrode 154 are formed from an ITO film, a tin oxide film, an indium oxide film or the like and are spaced apart on substrate 151. A water-repellant material 156 is deposited on the non-conductive regions between electrodes 154 by a brushing method, a dipping method, a spraying method or the like. This method will be illustrated in the following examples. FIG. 5(b) shows the terminal portion of the liquid crystal display panel 150 after baking in atmospheric air and FIG. 5(c) shows the terminal portion after applying a water-repellant material.

EXAMPLE 5

A fluorine group surface active agent (FC-721 produced by 3M Corporation) was diluted using trifluorotrichloroethane (Freon-TF produced by Mitsui Fluorochemical Co.). A liquid crystal display panel 160 was dipped into the Freon-TF solution and was connected at terminal portion 161 and 162 to a circuit substrate 163 through conductive rubber connector 166. Panel 160 was secured to substrate 163 by clips 168. An integrated circuit using an LCD driving circuit was mounted on the bottom surface of circuit substrate 163. Liquid crystal panel 160 was driven in alternating environments of 60° C.-90% RH and 20° C.-50% RH to determine resistance to corrosion. The environment was alternated repeatedly every 30 minutes for a total of 7 times.

One hundred (100) panels that had been subjected to the water-repellant treatment of this Example and another one hundred (100) panels which were not treated were tested. Table 9 shows the number of panels that failed per cycle of the test.

TABLE 9

| Number of Times of Test | 1 | 2 | 3 | 4 | 5 | 6 | 7 | Total |
|---|---|---|---|---|---|---|---|---|
| Products Subjected to Water Repel Treatment | 0 | 0 | 0 | 0 | 0 | 0 | 0 | 0 |
| Products Not-Yet Subjected To Water Repel Treatment | 0 | 0 | 1 | 0 | 2 | 2 | 1 | 6 |

In the display panels which were treated with the water-repellant solution, no disconnection failure occurred as a result of electrolytic corrosion reactions. Additionally, neither the rubber connector nor the water-repellant agent caused any deleterious effects to the display panels.

EXAMPLE 6

A silicon group surface active agent was diluted using isopropyl alcohol. Liquid crystal panel 160 was connected to a driving module 174 through a heat-seal 175 prior to dipping into isopropyl alcohol. While panel 160 was being driven, a test of its electrolytic corrosion reaction was performed as described in Example 5. Table 10 shows the results of the test for one hundred (100) such panels.

TABLE 10

| Number of Times of Test | 1 | 2 | 3 | 4 | 5 | 6 | 7 | Total |
|---|---|---|---|---|---|---|---|---|
| Products Subjected to Water Repel Treatment | 0 | 0 | 0 | 0 | 0 | 0 | 0 | 0 |

The liquid crystal display panels used in this test were subjected to water-repellant treatment and no disconnection failures occurred as a result of electrolytic corrosion. Furthermore, no deleterious effects were observed as a result of the influence of the water-repellant on the heat-seal and the driving module.

EXAMPLE 7

An ITO film was formed on a soda glass substrate by vacuum evaporation, coated with a $SiO_2$ film and patterned using photolithography. The electrode was heated in an air atmosphere at 300° C. for 1½ hours. As a result of heating the $SiO_2$ portion of the pattern gaps became water-repellant. Liquid crystal panels were assembled using these electrodes and an electrolytic corrosion reaction test was performed while driving the panels as described in Example 5. Table 11 shows the results of the test for one hundred (100) panels.

TABLE 11

| Number of Times of Test | 1 | 2 | 3 | 4 | 5 | 6 | 7 | Total |
|---|---|---|---|---|---|---|---|---|
| Products Subjected to Water Repel Treatment | 0 | 0 | 0 | 0 | 0 | 0 | 0 | 0 |

The same environment resisting property can also be obtained when the water-repellant property is provided only on the pattern gap portion and not on the entire panel as shown in Examples 5 and 6.

According to the present invention, high temperature baking of an ITO electrode is performed in a vacuum in order to suppress an increase in electrical resistance. Disconnection faults of the transparent electrodes, including ITOs, due to electrolytic corrosion can also be completely prevented. Additionally, disconnection faults at a terminal portion due to electrolytic corrosion when the LCD is driven under changing environmental conditions can be completely prevented. By providing a water-repellant property at the pattern gap portion of the terminal portion, moisture can be prevented from entering the terminal portion and a reliable optical panel can be obtained.

As described in this example, a water-repellant treatment can be provided during the step of producing an optical panel for use in an LCD and even after the optical panel has been assembled with a driving module. In this way, the step is simplified and can be performed by an ordinary user.

The present invention can also be applied to a panel type device of ECD, EL, plasma, magnetophoresis types and the like.

It will thus be seen that the objects set forth above among those made apparent from the preceding description, are efficiently attained and, since certain changes may be made in the above article and method without departing from the spirit and scope of the invention, it is intended that all matter contained in the above description and shown in the accompanying drawings shall be interpreted as illustrated and not in a limiting sense.

It is also to be understood that the following claims are intended to cover all of the generic and specific features of the invention herein described and all statements of the scope of invention which, as a matter of language, might be said to fall therebetween.

What is claimed is:

1. In an optical panel including at least one transparent substrate and a selectively patterned transparent electrode disposed on the interior surface of the substrate to form an electrode-substrate composite, the improvement which comprises an electrode-substrate composite which has been heated in a vacuum to a temperature within the range of from about 200° to 600° C. in order to increase the corrosion resistance of the electrodes.

2. The optical panel of claim 1, wherein the panel is a liquid crystal display panel.

3. An optical display assembly including an optical panel having at least one transparent substrate and a selectively patterned transparent electrode on the interior surface of the substrate to form an electrode-substrate composite, comprising an electrode-substrate composite which has been heated in a vacuum to a temperature within the range of from about 200° to 600° C. in order to increase the corrosion resistance of the electrodes and wherein said selectively patterned transparent electrode is electrically coupled to an optical panel driving circuit.

4. The optical display assembly of claim 3, wherein the optical panel is a liquid crystal panel.

5. In an optical display assembly including an optical panel having at least one transparent substrate with a selectively patterned transparent electrode disposed on the interior surface of the substrate defining an electrode-substrate composite, the composite including at least one end which extends beyond the opposed substrate for forming a terminal portion having thereon at least one electrode terminal portion and a nonconductive region, the terminal portion of the electrode for electrically connecting the optical panel to an external driving circuit, the improvement which comprises at least the non-conductive portion of the terminal region of the optical panel being water repellent in order to increase the corrosion resistance of the electrodes.

6. The optical display assembly of claim 5, wherein water-repellancy is imparted by heating the optical panel in an air atmosphere.

7. The optical assembly of claim 5, wherein the optical panel is a liquid crystal display panel.

8. A transparent electrode-substrate composite for use in an optical panel, comprising a transparent substrate, a patterned transparent electrode disposed on the substrate to form an electrode-substrate composite, the composite being treated in a vacuum at a temperature between about 200° and 600° C. in order to increase the corrosion resistance of the electrodes.

9. The electrode composite of claim 8, further including at least one layer of a transparent non-conductive material disposed on the electrode.

10. The electrode composite of claim 9, wherein the transparent electrode is ITO and the non-conductive material is silicon dioxide.

11. A method of preparing a transparent electrode composite for use in an optical display panel, comprising:
    depositing a transparent electrode on a transparent panel substrate to form an electrode-substrate composite, and
    heating the electrode-substrate composite in a vacuum at a temperature between about 200° C. and 600° C. in order to increase the corrosion resistance of the electrode.

12. A method of assemblying a liquid crystal display device, comprising:
    selectively depositing transparent electrodes on transparent substrates in patterns for cooperating to form display indicia;
    depositing a transparent layer of non-conductive material on the electrodes on the substrates;
    heating the electrodes and substrates in a vacuum at a temperature between about 200° C. and 600° C. for a time sufficient to increase the corrosion resistance of the electrodes;
    placing the cooperating substrates with the electrodes in face to face alignment for forming the selected display indicia with a space formed between the substrates;
    adding a liquid crystal material to the space between the substrates; and
    electrically connecting the electrodes to an external driving circuit.

13. The method of preparing the display panel of claim 12, further including the step of dipping the assembled liquid crystal panel into a water-repellant material.

14. The method of claim 12, wherein the substrates are aligned so that one substrate extends beyond the opposed substrate at at least one edge thereof for forming an electrode terminal portion for coupling the assembled panel to an external driving circuit and at least the non-conductive portions of the terminal region being treated with a water-repellant material.

* * * * *